United States Patent

Moir et al.

[11] Patent Number: 5,923,498
[45] Date of Patent: Jul. 13, 1999

[54] DISC CLAMP ASSEMBLY FOR A DISC DRIVE

[75] Inventors: Michael Bruce Moir, Newbury Park; Richard Gene Krum, Thousand Oaks, both of Calif.

[73] Assignee: Seagate Technology, Inc., Scotts Valley, Calif.

[21] Appl. No.: 08/767,711

[22] Filed: Dec. 17, 1996

Related U.S. Application Data

[60] Provisional application No. 60/008,750, Dec. 18, 1995.
[51] Int. Cl.⁶ .................................................. G11B 17/02
[52] U.S. Cl. .......................................................... 360/98.08
[58] Field of Search ............................................ 360/98.08

[56] References Cited

U.S. PATENT DOCUMENTS

| | | | |
|---|---|---|---|
| 5,101,306 | 3/1992 | Johnson | 360/98.08 |
| 5,497,281 | 3/1996 | Jewell et al. | 360/98.08 |
| 5,590,004 | 12/1996 | Boutaghou | 360/98.08 |

*Primary Examiner*—Robert S. Tupper
*Attorney, Agent, or Firm*—Edward P. Heller, III; Raghunath S. Minisandram

[57] ABSTRACT

A disc clamp assembly is provided for securing a plurality of information storage discs to a spindle hub on a disc drive spindle motor assembly. The disc clamp assembly includes a clamping ring and a resilient grip ring. The clamping ring has a raised Inner portion and rests on the information storage disc. The resilient grip ring has an inner diameter smaller than the diameter of the spindle hub, a middle portion to receive an axial force and a means for receiving radial force. The middle portion of the grip ring rests on the raised inner portion of the clamping ring. While the means for receiving radial force of the grip ring receives a radial force to radially expand the grip ring, the middle portion of the grip ring receives an axial force and applies the axial force to the clamping ring and the information storage discs. Upon removal of the radial force to the grip ring, the grip ring maintains the axial force applied to the information storage discs by gripping the spindle hub.

8 Claims, 4 Drawing Sheets

DISC CLAMP ASSEMBLY FOR A DISC DRIVE

This application claims the benefit of provisional application Ser. No. 60/008,750 filed on Dec. 18, 1995, entitled Disc Clamp and Spacer.

The present invention relates generally to an improved disc clamp for securing rotational information storage discs within disc drives.

BACKGROUND OF THE INVENTION

Disc drive machines record and reproduce information stored on a recording media. Conventional Winchester-type disc drives include a plurality of vertically-aligned, rotating information storage discs, each having at least one associated magnetic head that is adapted to transfer information between the disc and an external computer system. The information storage discs are journaled about a spindle motor assembly capable of rotating the discs at high speeds. The heads are carried by a plurality of vertically-aligned, elongated flexure arms that in turn are carried by a head positioner assembly. The head positioner assembly is adapted to move the heads back and forth in unison across the face of the vertically-aligned, elongated flexure arms that in turn are carried by a head positioner assembly. The head positioner assembly is adapted to move the heads back and forth in unison across the face of the vertically-aligned discs. The head positioner assembly are traditionally either rotationally mounted, or take the form of a carriage that is free to move back and forth along a single axis. In either case, the head positioner assembly is adapted to precisely position the heads relative to the magnetic information storage discs.

The spindle motor assembly includes a rotatable spindle hub that is carried by a fixed spindle shaft securely mounted to the housing. A plurality of information storage discs are journaled about the spindle hub. Spacer discs are provided between adjacent information storage discs. The vertically aligned information storage discs are clamped to the spindle hub by a disc clamp secured by a plurality of screws.

In practice, the disc clamp design is quite critical to high performance disc drives and there are several design criteria that must be met in order to provide an effective disc clamp. Specifically, the disc clamp must provide a uniform clamping force along its clamping surface to avoid such problems as top disc distortion. The clamp must also be designed to uniformly distribute its internal stress in order to minimize clamping force variations due to thermal expansions. Similarly, to facilitate installation and repair of the discs, it is important that resultant stress distribution within the clamp be relatively independent of the sequence in which the clamp screws are attached and the magnitude of the intermediate torques applied during installation.

Another drawback of many prior art disc clamps is that the screws that secure the disc clamp to the spindle hub tend to loosen as a result of thermal cycling of the drive due to stress imbalances with the clamp.

Although several suitable disc clamps have been designed in the past, effective disc clamp designs have traditionally required expensive alloys with high yield strength to accommodate the high stress concentration. However, the use of specialized alloys significantly increases production costs and fabrication complexity.

Further, one of the drawbacks of prior art disc clamps that have used screws as an attachment means is that the disc clamp is designed through an iterative process that begins with the creation of a force deflection curve and torque-deflection measurements that establish the relationship between the screw-tightening torque and the actual clamping force applied by particular disc clamps. Non-operating shock tests are performed using an actual drive to determine the minimum screw tightening torque needed to maintain the discs in place without any disc slippage.

Further, in the prior art, the use of screws creates localized point loading, thus not inherently providing equal clamping over the 360° contact surface.

More recently, heat shrink clamps have been employed, wherein a sleeve is heated to a high temperature and cooled after the application of appropriate clamp load. Such a method of attachment requires custom heaters which are capable of selectively heating the clamp and the assembly process requires time to heat the clamp to the desired temperature and then cooling them back to room temperature.

SUMMARY OF THE INVENTION

Accordingly, it is an objective of the present invention to provide a novel disc clamp design that does not use screws to attach the disc clamp, thus eliminating any localized point loading.

It is a further object of this invention to reduce the amount of time required to assemble a disc pack.

It is a further objective of this invention to provide equal clamping load over the 360° contact surface.

To achieve the foregoing and other objects in accordance with the purpose of the present invention, a disc clamp assembly is provided for use within a disc drive to secure a plurality of information storage discs arranged as a disc pack to a spindle hub on a spindle motor assembly disposed within the drive. The disc clamp assembly includes a clamping ring and a grip ring. The clamping ring is slipped over the spindle hub and rests on the information storage disc. The grip ring has an inner diameter smaller than the diameter of the spindle hub. The grip ring is expanded by applying a radial force and then installed over the hub. While maintaining the radial force, an axial force is applied to the grip ring, around the middle portion, which is transferred to the clamping ring and then to the disc pack, until there is no further motion of the disc pack. Then, the radial force upon the grip ring is removed. The grip ring firmly holds on to the outer diameter of the spindle hub, still maintaining the axial clamp load to the disc pack. The clamping ring, around its outer periphery has a rounded convex surface which transfers the clamping load to the disc pack. In the preferred embodiment, the grip ring has an outer raised portion, which can receive the radial force.

In an alternate embodiment, the grip ring has plurality of slots to receive tips of a tool capable of providing radial force.

DETAILED DESCRIPTIONS

As is generally known in the art, the illustrative disc drive unit 10 includes a head positioner assembly (not shown)

mounted within the housing 16 at a position along the disc stack. The head positioner assembly supports a plurality of individual arms having electro-magnetic transducer heads at the distal ends there of in close proximity with respective upper and lower surfaces on the information storage disks. A suitable actuator motor (not shown) such as a movable coil DC motor, and a corresponding motor controller function to displace the magnetic transducer head through generally radial traverses relative to the information storage disks 14 for the purposes of reading and writing data, all in a well known manner.

Figure 1:
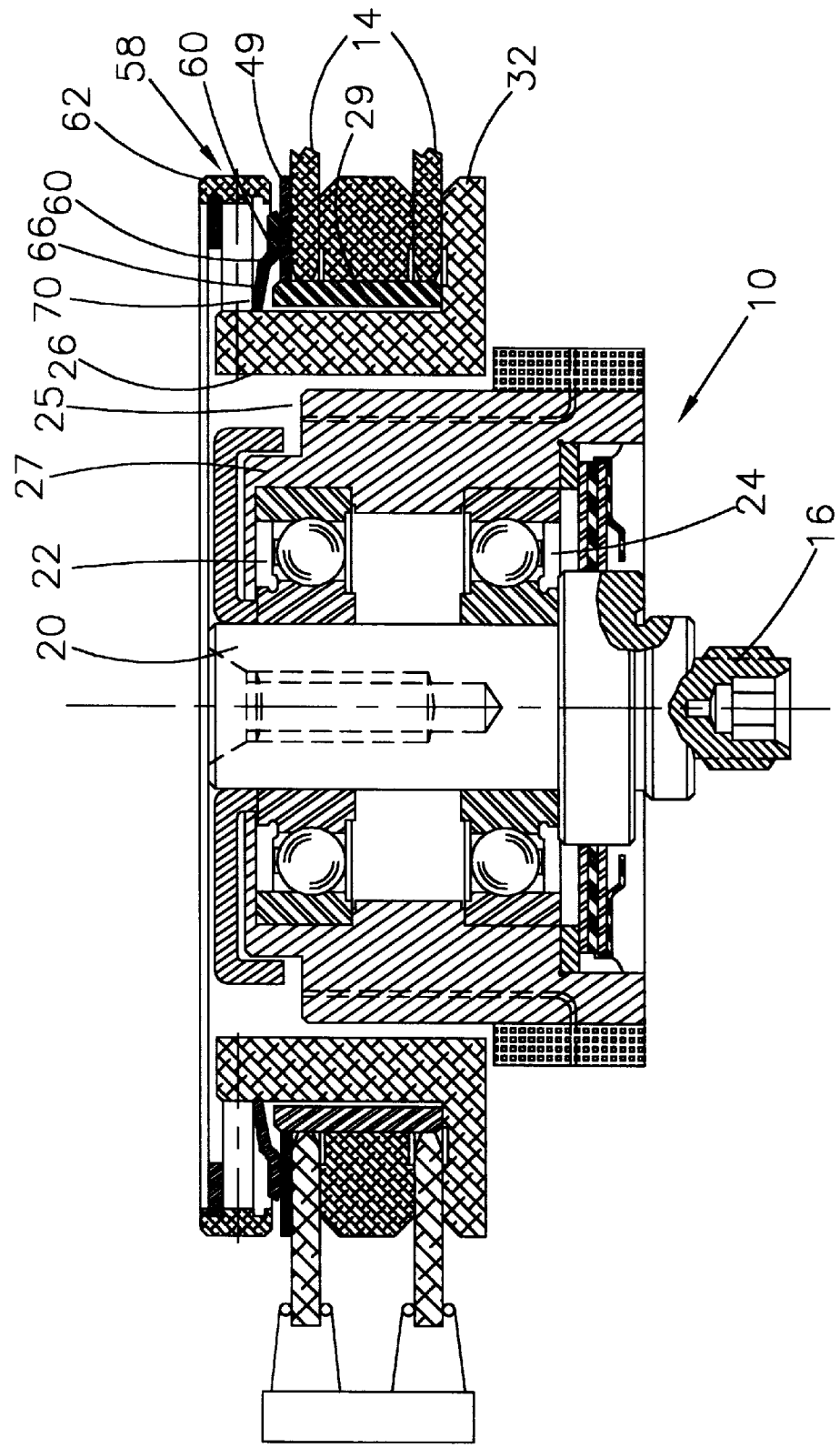
FIG. 1 is a sectional elevational view through a partial disc drive unit showing novel disc clamp assembly showing the clamp ring and grip ring of the present invention.

With reference to FIG. 1, a central shaft 20 is securely fixed to a portion of the housing lower base 16, and the information storage disks 14 are mounted for rotational movement within the housing 16 about the shaft 20. Central shaft 20 is also attached to the inner races of upper bearing and lower bearing.

The outer races of the upper bearing 22 and the lower bearing 24 support the rotor of the spindle motor. The rotor 25 includes sleeve 27 and spindle hub 26. Sleeve 27 is preferably stainless steel and spindle hub 26 is preferably aluminum. Spindle hub 26 is preferably heated and shrink fit over the outer surface of the sleeve 27 to securely attach spindle hub 26 and sleeve 27. The sleeve has a radially and inwardly extending middle flange on which the outer races of the upper bearing 22 and lower bearing 24 rest. The sleeve supports, at its lower end, a plurality of permanent magnets which interact with an electromagnetic stator core to rotate the spindle hub about the center shaft in a known manner.

The spindle hub near the lower end, has a radially and outwardly extending hub flange 32. A disc centering sleeve 29 with plurality of symmetrically located axial ribs both on the inner diameter and outer diameter is slid over the spindle hub 26 such that inner axial ribs rest against the outer surface of the spindle hub 26. A first information storage disc 14 is stacked on top of the hub flange 32. A disc spacer 48 is stacked on top of the first information disc and a second disc 14 is stacked on top of the disc spacer 48. A circular support ring 49 is placed on top of the second information storage disc. The outer ribs of the disc centering sleeve 29 radially push and center the information storage discs, the disc spacer and the support ring so that they are all positioned concentric with the central hub, thus aiding in maintaining a balanced load along the axis of the central hub. A novel disc clamp assembly 58 of the present invention including a clamp ring 60 and a grip ring 62 applying clamp load to the disc pack as shown, features of which will be fully explained below.

The clamping ring 60 is a stamped sheet metal part. The clamping ring 60 has an inner diameter larger than the outer diameter of the spindle hub 26, so that the clamping ring 60 can be slipped over the spindle hub 26 and rest on the top surface of the support ring 49. The clamping ring 60 further having a rounded convex surface 64 near the outer periphery, so that the clamp force is applied away from the inner diameter of the information storage discs 14. The clamping ring further having a raised inner portion 66 on which the lower surface of the grip ring 62 rests.

The grip ring 62 is an extruded and machined part. The grip ring 62 inside diameter is smaller than the diameter of the spindle hub 26, however the grip ring 62 is resilient so that it can be mechanically expanded radially to a point below its yield strength, and larger than the outer diameter of the spindle hub 26. The grip ring 62 further having a means for receiving such a radial force. The grip ring 62 further having a means for receiving an axial force. During assembly process, the grip ring 62 is radially expanded and slid over the spindle hub 26 and while still maintaining the radial force, an axial force is applied to the clamping ring 60 and the disc pack until there is no further movement of the disc pack. While still maintaining the axial force, the radial force is removed so that the grip ring 62 can grip the spindle hub 26 and continue to maintain the axial force.

Figure 2:
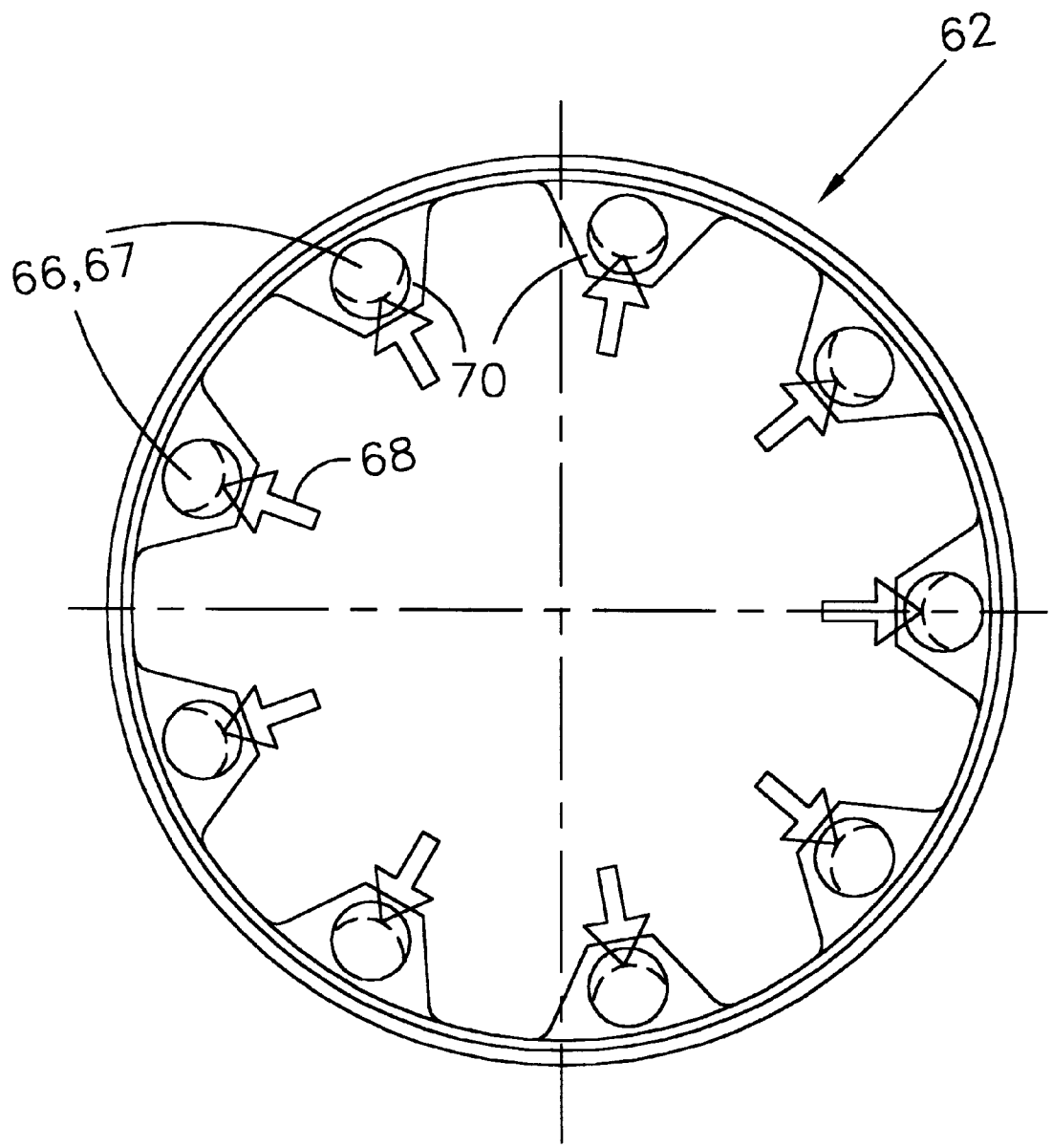
FIG. 2 is a plan view of the grip ring of the present invention.

FIG. 2 is a plan view of the grip ring 62 of the present invention. The figure shows plurality of slots 67 to receive tips of a tool capable of applying radial and axial force. The arrows 68 represent the direction of application of radial force. The grip ring further includes a middle portions 70 to receive the axial force applied to the disc pack. The lower surface of the middle portion 70 rests on the inner portion 66 of the clamping ring 60.

Figure 3:
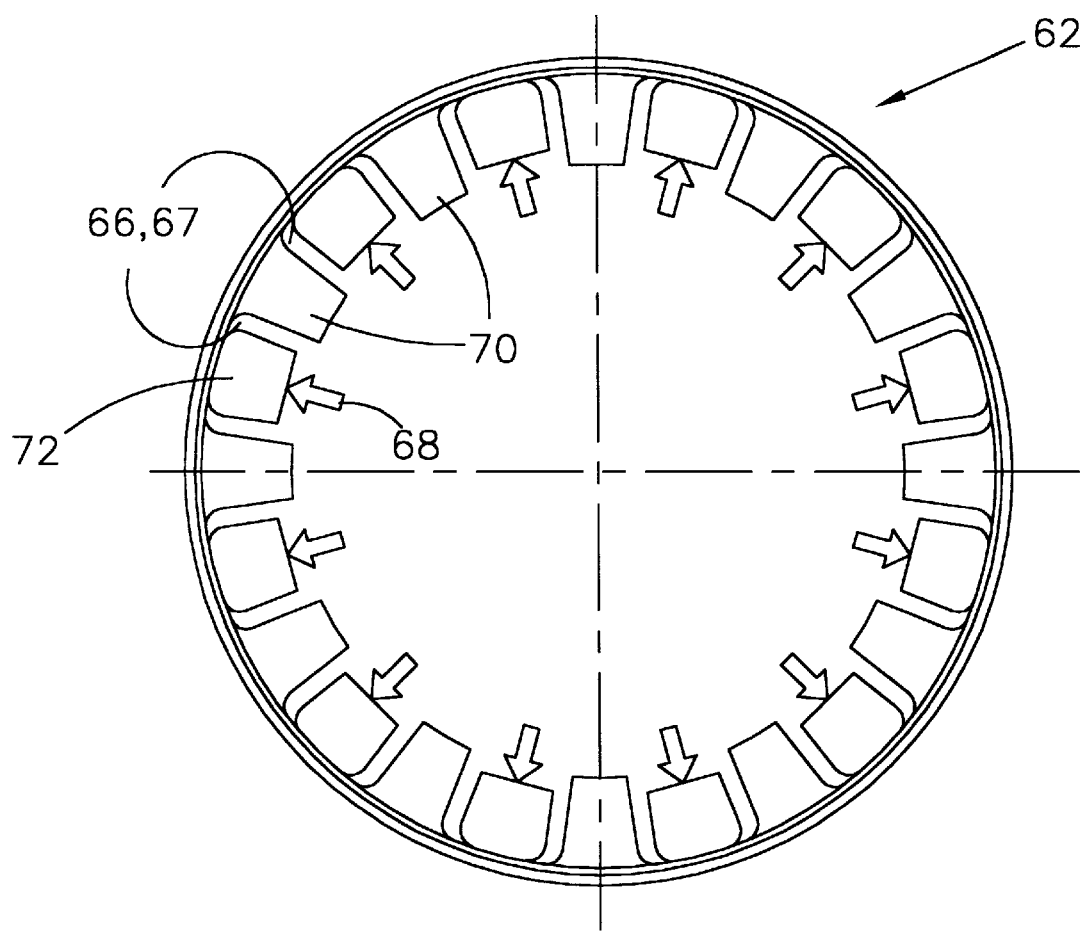
FIG. 3 is a plan view of an alternate grip ring of the present invention.

FIG. 3 is a plan view of an alternate embodiment of the grip ring 62 of the present invention. The figure shows plurality of slots 67 to receive tips 72 of a tool capable of applying radial and axial force. The arrows 68 represent the direction of application of radial force. The grip ring further includes a middle portions 70 to receive the axial force applied to the disc pack. The lower surface of the middle portion 70 rests on the inner portion 66 of the clamping ring 60.

Figure 4:
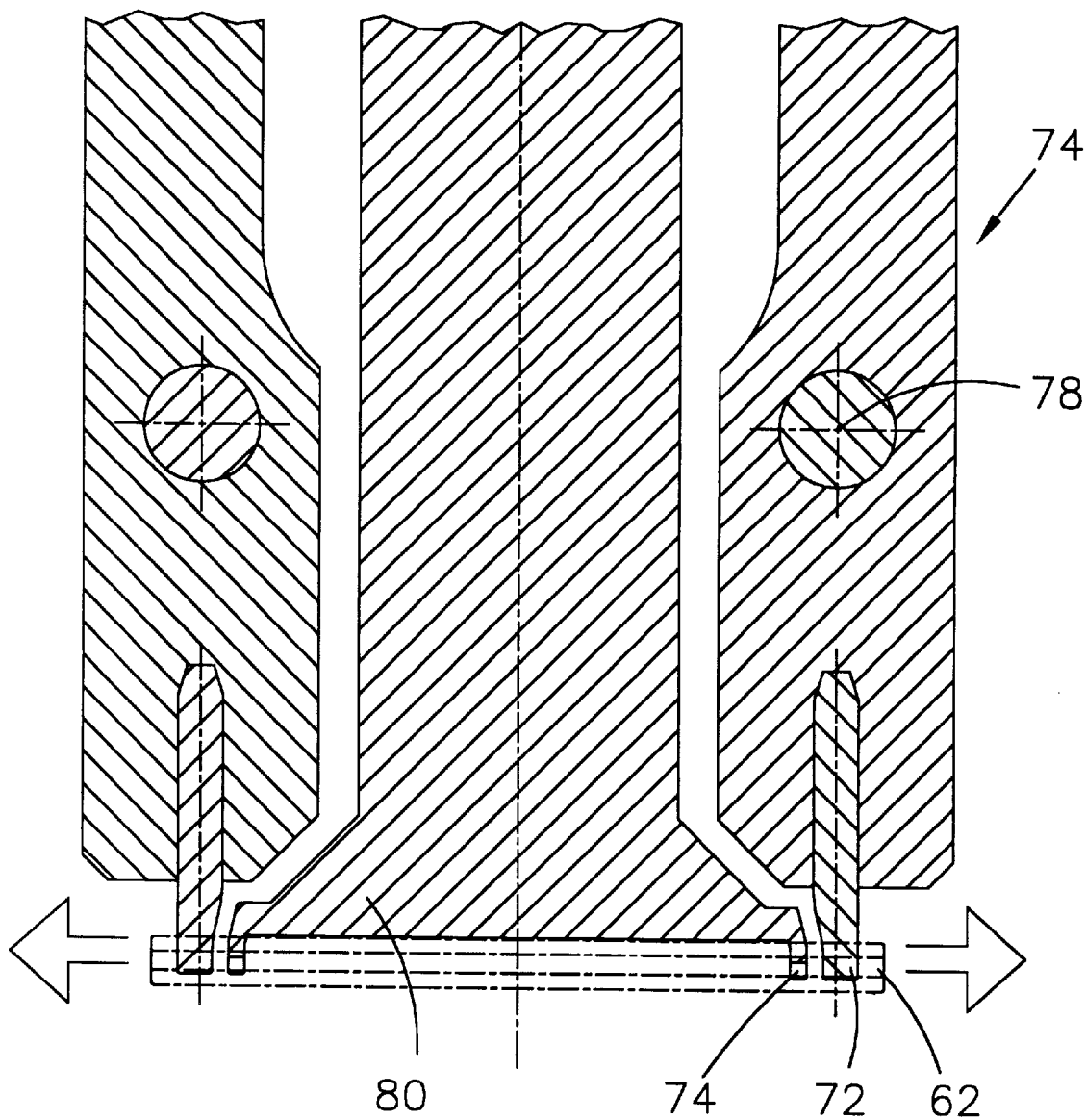
FIG. 4 is a sectional elevational view of a grip ring of the present invention along with a tool capable of applying axial and radial force to the grip ring.

FIG. 4 shows the grip ring 62 of the present invention along with a tool 74 capable of applying both radial and axial force. The tool 74 includes an arm 76, ends of which have tips 72. The arm 76 is pivotally mounted at 78 so that the tips can move in a radial direction. The tool 74 further includes a middle portion 80, ends of which rests on the middle portion 70 of the grip ring 62 so that an axial force can be applied to the grip ring 62. The radial movement of the arm 76 is limited so that the radial force applied to the grip ring 62 is sufficient to expand the grip ring 62 so that it can slide over the spindle hub 26, but yet below the yield strength of the grip ring 62.

From the above description, it is apparent that many modifications and variations of the present invention are possible in light of the above teachings. It is therefore to be understood that, within the scope of the appended claims, the invention may be practiced otherwise than as specifically described hereinabove.

We claim:

1. A disc clamp assembly for securing a plurality of information storage discs to a spindle hub on a disc drive motor assembly comprising:

a clamping ring having a raised inner portion;

a resilient grip ring having an inner diameter smaller than the diameter of said spindle hub, a middle portion for receiving an axial force and a means for receiving a radial force, said middle portion resting on said raised inner portion of said clamping ring, while said means for receiving a radial force receiving a radial force to radially expand said resilient grip ring, said middle portion receiving an axial force and applying said axial force to said clamping ring and said information storage discs and upon removal of said radial force, maintaining said axial force to said information storage discs by gripping said spindle hub.

2. The disc clamp of claim 1, wherein said means for receiving a radial force includes an outer raised portion.

3. The disc clamp of claim 1, wherein said means for receiving a radial force includes plurality of axial slots in said grip ring.

4. The disc clamp of claim 1, wherein said clamping ring having a rounded convex surface, said rounded convex surface applying clamp force to said information storage disc.

5. The disc drive of claim 1, wherein said means for receiving a radial force includes an outer raised portion.

6. The disc drive of claim 1, wherein said means for receiving a radial force includes plurality of axial slots in said grip ring.

7. A disc drive system comprising:

a spindle hub, a plurality of information storage discs journaled about said spindle hub in spaced apart, vertically aligned relation, said information storage discs being coupled to said spindle hub to rotate with the spindle hub;

a plurality of magnetic transducer heads for writing information onto the information storage discs and for reading information out from the information storage discs;

a head positioner assembly for positioning the transducer heads relative to the information storage discs;

a disc clamp for securing the information storage discs to the spindle hub on a disc drive spindle motor assembly including:

a clamping ring having a raised inner portion;

a resilient grip ring having an inner diameter smaller than the diameter of said spindle hub, a middle portion for receiving an axial force and a means for receiving a radial force, said middle portion resting on said raised inner portion of said clamping ring, while said means for receiving a radial force receiving a radial force to radially expand said resilient grip ring, said middle portion receiving an axial force and applying said axial force to said clamping ring and said information storage discs and upon removal of said radial force, maintaining said axial force to said information storage discs by gripping said spindle hub.

8. The disc drive of claim 7, wherein said clamping ring having a rounded convex surface, said rounded convex surface applying clamp force to said information storage disc.

* * * * *